(12) United States Patent
Ketchapaw et al.

(10) Patent No.: US 6,726,179 B2
(45) Date of Patent: Apr. 27, 2004

(54) FIFTH WHEEL HELPER

(76) Inventors: John Howard Ketchapaw, 1948 Coit NE., Grand Rapids, MI (US) 49505; Clifford Ketchapaw, 7393 Sandelwood, Jenison, MI (US) 49428

( * ) Notice: Subject to any disclaimer, the term of this patent is extended or adjusted under 35 U.S.C. 154(b) by 0 days.

(21) Appl. No.: 09/977,536

(22) Filed: Oct. 15, 2001

(65) Prior Publication Data

US 2003/0071250 A1 Apr. 17, 2003

(51) Int. Cl.[7] .................................................. B66S 9/02
(52) U.S. Cl. ........................ 254/104; 340/341; 340/435; 280/437; 280/433; 280/434; 280/441.1; 280/763.1; 280/901; 254/424
(58) Field of Search ................................. 254/104, 424, 254/419; 280/425.1, 432, 433, 434, 507, 901; 340/341, 435

(56) References Cited

U.S. PATENT DOCUMENTS

| | | | | |
|---|---|---|---|---|
| 3,649,047 A | * | 3/1972 | Plantan | 280/425.1 |
| 3,810,663 A | * | 5/1974 | Berends | 280/425.1 |
| 3,874,699 A | * | 4/1975 | Hayes | 280/432 |
| 4,147,372 A | * | 4/1979 | Sumpter | 280/433 |
| 4,193,350 A | * | 3/1980 | Niggemeier | 410/64 |
| 5,090,720 A | * | 2/1992 | Heider | 280/438.1 |
| 5,533,710 A | * | 7/1996 | Sauber | 254/134.3 |
| 5,961,140 A | * | 10/1999 | Huskey | 280/507 |
| 6,024,372 A | * | 2/2000 | Colibert et al. | 280/417.1 |
| 6,308,977 B1 | * | 10/2001 | Pulliam | 280/441 |

* cited by examiner

Primary Examiner—Joseph J. Hail, III
Assistant Examiner—Daniel Shanley
(74) Attorney, Agent, or Firm—Waters & Morse P.C.

(57) ABSTRACT

A fifth wheel helper is adapted to be inserted underneath a fifth wheel hitch plate to hold it in a horizontal position so that the truck can be pulled forward after the king pin of the trailer has been trapped behind the fifth wheel. The fifth wheel helper comprises a solid piece of material having a tapered first end and a flat second end and an indentation on an underside thereof for engaging a truck frame rail to hold the fifth wheel helper underneath the hitch plate. A safety bolt is provided for locking the fifth wheel helper on the truck frame rail.

11 Claims, 3 Drawing Sheets

FIFTH WHEEL HELPER

BACKGROUND OF THE INVENTION

1. Field of the Invention

The current invention relates to a system for releasing a towing unit from a towed unit, e.g., a trailer. In particular, the invention is adapted to assist the driver of a towing unit with releasing a king pin of the trailer from a locked position behind the fifth wheel of the commercial towing unit.

2. Background Art

The interlocking apparatus for connecting a truck and trailer is comprised of components on both the truck and the trailer, which mate to achieve a mechanical connection. Typically, the truck is equipped with a locking assembly, known in the heavy trucking industry as a fifth wheel hitch, and the trailer is equipped with an apparatus known in the industry as a king pin. The king pin extends downwardly from an underside of the trailer, perpendicular to a bolster plate to which it is attached, the bolster plate being mounted to the bottom surface of the trailer. The fifth wheel hitch includes a rearwardly pivoting hitch plate having a throat with its open end facing rearward to receive the king pin as the truck is backed toward the trailer. The fifth wheel hitch also includes a locking mechanism for locking the king pin in the throat of the hitch plate. The hitch plate is generally slanted downwardly toward the rear of the truck.

To couple a vehicle, such as a commercial truck, to a trailer, the driver must continually estimate the position of the vehicle, relative to the trailer, while maneuvering the vehicle into alignment with the trailer. In practice, this may involve exiting the truck to determine the position of the truck relative to the trailer and then re-entering the truck to maneuver it into alignment. In addition, the driver utilizes his rear view side mirrors to approximate the lateral alignment between the truck and trailer. It is also necessary to align the trailer king pin vertically with the throat in the hitch plate. This is done by a conventional lift mechanism in the trailer that raises and lowers the front end of the trailer. Vertical alignment is often judged only by "feel," or guess. This practice often leads to high or low coupling and, possibly, lateral misalignment between the truck and trailer.

When backing up the towing unit, the driver often experiences difficulty in aligning the throat of the hitch plate with the king pin. For instance, the height of the king pin relative to the throat may be such that proper mating between the two will not be achieved, even though the two may be laterally aligned. In these instances, the front lower edge of the trailer may crash into the fifth wheel hitch plate (trailer and king pin too low) or the cab of the truck may crash into the body of the trailer (trailer and king pin too high). With an optimum connection, the weight of the trailer will rest upon the fifth wheel hitch plate, which normally has a downward angle. As the trailer weight is applied to the hitch plate, the angle of the fifth wheel hitch plate will flatten out into a horizontal position beneath the trailer and match the aforementioned bolster plate in a face to face manner. In this instance, the king pin will enter the throat of the hitch plate and be locked in place.

However, it is the situation of having a king pin too high, the king pin passes entirely over the top of the hitch plate and becomes trapped behind (i.e., in front of the front edge of) the fifth wheel. That paves the way for the current invention. When the cab of a truck is driven back far enough to hit the front portion of the trailer, a situation arises where the king pin can be trapped behind the fifth wheel. This occurs because the fifth wheel hitch plate is mounted with a pivotal mount that allows the trailer weight to flatten out the fifth wheel. When the king pin is slightly higher than the open receiving portion of the fifth wheel hitch plate, the king pin will maintain enough weight to force the fifth wheel hitch plate to horizontally position itself as the king pin passes over the hitch plate. However, at such time as this occurs, the king pin will not enter the throat and lock, but rather pass completely over the top of the fifth wheel hitch plate. Once the king pin passes the hitch plate, the fifth wheel hitch plate pivots back to the standard rear-facing angle, where it is positioned behind the king pin. At this point, the king pin is locked or trapped and can no longer become free of the fifth wheel without further human assistance.

The most common remedy for this situation involves a set of rather dangerous circumstances. A second person must assist the driver by standing in the rear of the towing unit, usually between the sets of rear tires. This is due to the natural slant of the fifth wheel hitch plate that must be forced into a horizontal position. The second person must push the front of the fifth wheel hitch plate in a downward direction, or lift the rear in an upward direction. Commonly a crow bar or scrap metal is used in order to cause the pivotal fifth wheel to lie back in the horizontal position. Meanwhile, the driver pulls forward unable to see the person assisting him because the standing location is a blind spot for the driver. The potential for accidents is high and the results desired are not always guaranteed.

In the event that the prior remedy should fail, Hi-lows are pulled off of the job and placed on either side of the trailer in order to lift it far enough for the driver to pull the truck forward and release the king pin. The final alternative is attaching a wrecker to the front portion of the trailer and raising the king pin thus, allowing the driver to pull forward. Both situations give rise to wasted time and money for the driver and for the workers being pulled off of their jobs.

As the case is once in a while, the driver of a commercial vehicle could be picking up a trailer after working hours. In the event that a king pin is locked, a driver could be stuck for hours waiting for someone to come along and help. This causes unnecessary frustration on the driver and a time restraint on meeting a deadline for delivery often associated with the trucking industry.

As a result, systems have been developed to provide an output signal to the driver indicating the position of the truck relative to the trailer. Notably, known systems are targeted toward "ball and hitch" coupling market and are not easily adaptable to the heavy trucking industry.

Known alignment systems use a variety of technologies to measure lateral offset and vertical alignment. Primarily, these systems utilize infrared sensor technology with a modulated pulsed beam. As such, these systems are limited in range (typically less than 20 feet) and require separate sets of infrared sensors on the towing and towed units, respectively, to indicate the lateral offset and vertical alignment. Also, because the infrared emitters and sensors are required on both the towing and towed units, the system must include a remote, powered transmitter on the towed unit. Clearly, these systems are limited in their application, inconvenient, and relatively expensive. In addition, should the maneuvering system fail, there is no safe procedure for releasing the trapped king pin.

3. SUMMARY OF THE INVENTION

The fifth wheel helper is designed to assist the driver of a commercial towing unit with the ability to release a locked king pin without the assistance of another person. Quite simply, the fifth wheel helper attaches to the frame of a towing unit just under the fifth wheel. Thus, causing the fifth wheel to lay in a horizontal position flush under the king pin. This allows the driver to pull safely forward without fear of another person physically holding the fifth wheel in the horizontal position.

The physical structure of the fifth wheel helper is a metal reinforced two by four block of wood. A second embodiment would be of hard plastic, or steel. One side is angled to slide under the fifth wheel and an indentation on the under side allows the invention to rest on the frame of the towing unit. Due to potential variations in frame size, a locking bolt is in place to tighten the grip of the fifth wheel helper to the frame. This is to prevent the fifth wheel helper from falling while the driver is pulling forward.

The main objective of the fifth wheel helper is to promote safety in the joining procedure between the towing unit and the commercial trailer, once a locked king pin situation arises. The opportunity for losing limbs or life is too high when a second person must stand in the driver's blind spot between sets of tires.

Additional safety is obtained when thought is directed towards the hours of wasted time that truck drivers must make up in order to beat deadlines. A rushed freight driver is a dangerous hazard to the safety of not only themselves, but other road traffic as well.

4. BRIEF DESCRIPTION OF THE DRAWINGS

5. DESCRIPTION OF THE PREFERRED EMBODIMENT

Figure 5:
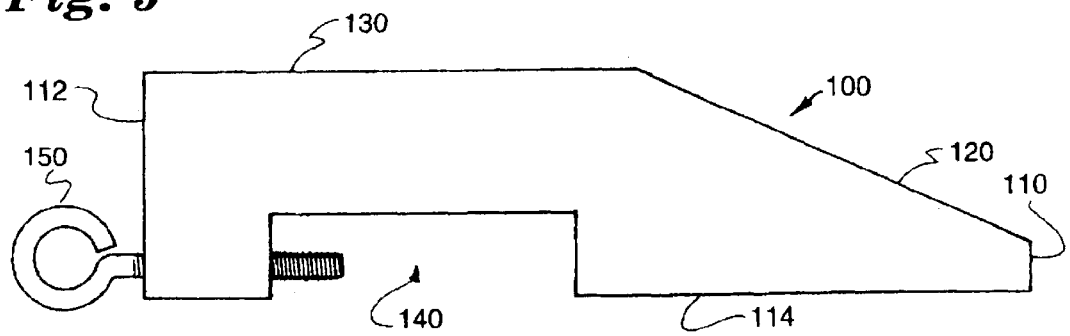
FIG. 5 is a side view of a fifth wheel helper according to the invention.

The side view of the current invention is portrayed in FIG. 5. In one embodiment, the main body is a two by four block of wood measuring about seventeen inches and five centimeters in length. As shown by FIG. 5, the front portion 120 is angled so as to slide under the front portion of the fifth wheel. The indentation 140 on the underside is positioned to hold the fifth wheel helper to the frame of the truck beneath the fifth wheel itself. The indentation prevents any slipping to the left or right, rear or frontal angles that a regular board may be inclined to do. The four-inch safety bolt 150 is a safety measure to lock the fifth wheel helper to the frame of the truck.

Figure 6:
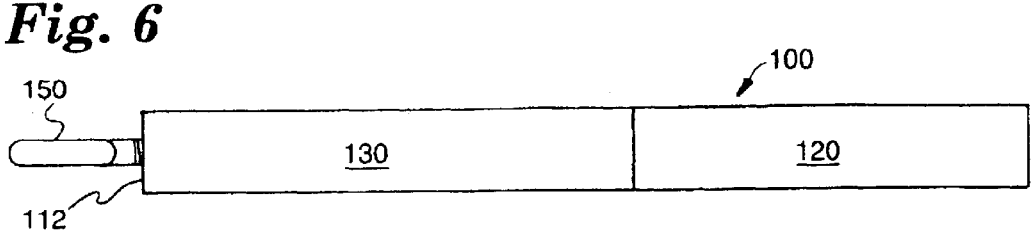
FIG. 6 is a top view of the fifth wheel helper of FIG. 5.

The perspective shown in FIG. 6 is representative of the top view of the fifth wheel helper. Quarter inch stainless steel can be applied to the wood and held in place by four half-inch wood screws. The bottom segment, FIG. 7, displays another portion that can be reinforced by quarter inch sheet metal held by two half-inch wood screws on either side of the indentation. Should the current invention be manufactured out of molded plastic or aluminum, there would be no need for the quarter-inch stainless steel, or the half-inch wood screws. The form of the body shall remain approximately seventeen inches and five centimeters; however there shall be one continuous form.

Figure 1:
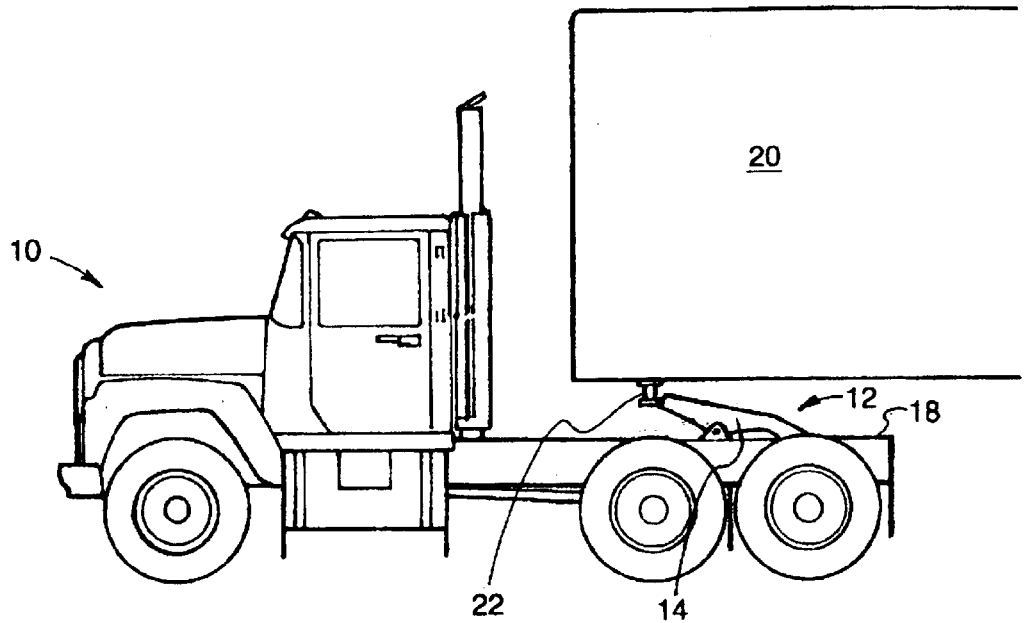
FIG. 1 is a side view of a conventional truck and trailer with the trailer king pin trapped behind the truck fifth wheel hitch.
Figure 2:
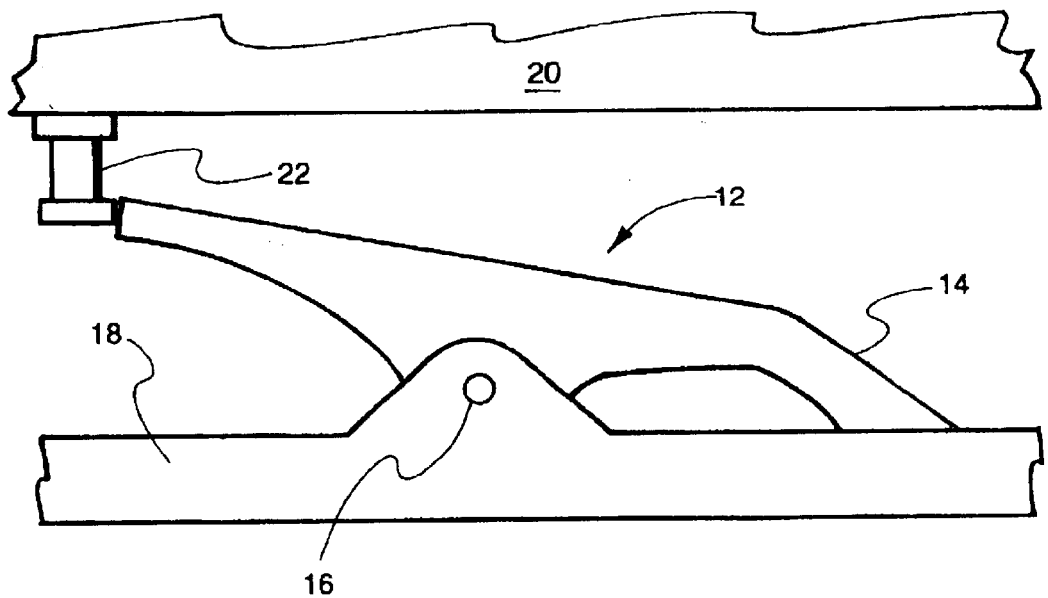
FIG. 2 is an enlarged detail view showing the king pin of FIG. 1 trapped behind the fifth wheel.

FIGS. 1 and 2 disclose the relationship of a tractor 10 of a conventional truck having a fifth wheel assembly 12 with a trailer 20 having a king pin 22 mounted below a horizontal bolster plate 23. The fifth wheel assembly 12 comprises a hitch plate 14 pivotally mounted on an axis 16 to truck frame rails 18. In the truck and trailer assembly shown in FIGS. 1 and 2, the truck has been backed up to the trailer to engage the king pin 22 in the hitch plate 14, but due to an error in vertical alignment, the king pin 22 has overridden and become trapped behind the hitch plate 14. The hitch plate 14 is biased to rotate about axis 16 to present a downward angle toward the rear of tractor 10. If vertical alignment was correct, king pin 22 would enter hitch plate throat 30 (see FIG. 3) and hitch plate 14 would engage the bolster plate 23 on the underside of trailer 20 and be pivoted to a horizontal position. Because the hitch plate 14 is downwardly and rearwardly biased, the front edge pivots upwardly behind the overridden king pin. To release the king pin in the hitch plate, it must be forced into a horizontal position in order for the trapped king pin 22 to be released as the truck is pulled forward.

Figure 7:
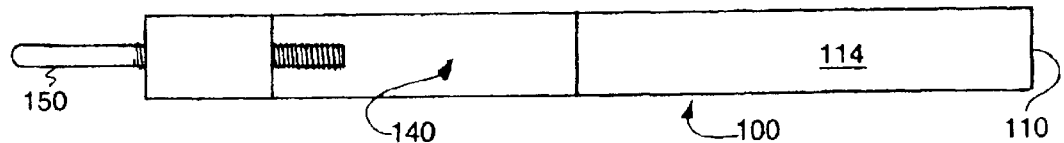
FIG. 7 is a bottom view of the fifth wheel helper of FIG. 5.

Referring to FIGS. 5–7, a fifth wheel helper 100 according to the invention has a first end 110, a second end 112, an upper surface 130, a lower surface 114, and a ramped surface 120. In one embodiment, the first end 110 measures approximately one inch in height while the total height from lower surface 114 to upper surface 130 measures four and one-half inches. The total length of the embodiment is seventeen inches. Approximately eighteen and one-half inches from the first end is an indentation 140 adapted to fit over the truck rails 18 of the truck 10. A threaded aperture passes from second end 112 into the indentation 140 and is adapted to receive a safety bolt 150 that can be manually threaded through the threaded aperture into the indentation 140.

Figure 4:
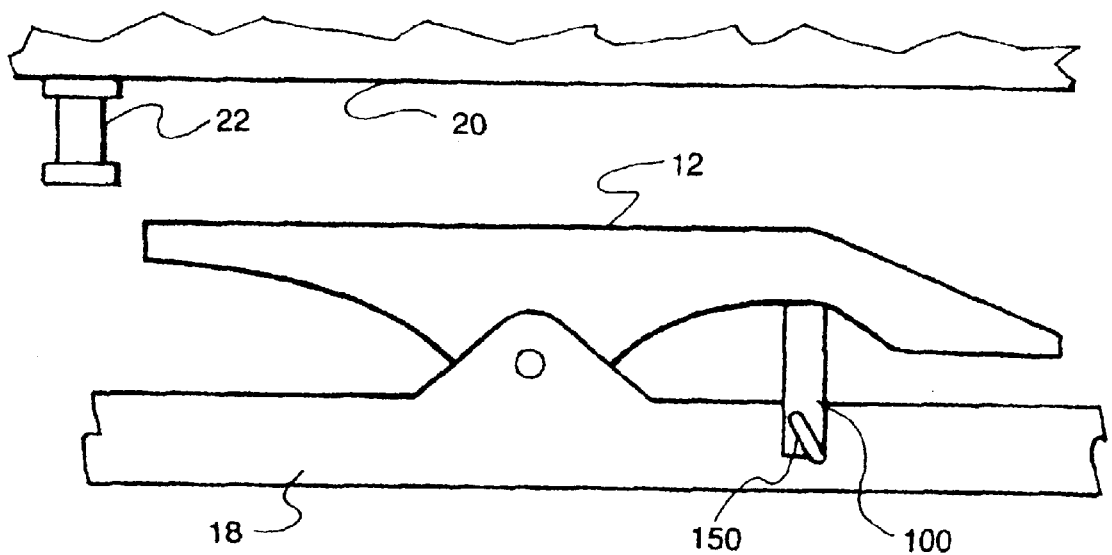
FIG. 4 is a side view of the fifth wheel helper of FIG. 3 engaged with a truck fifth wheel hitch.
Figure 3:
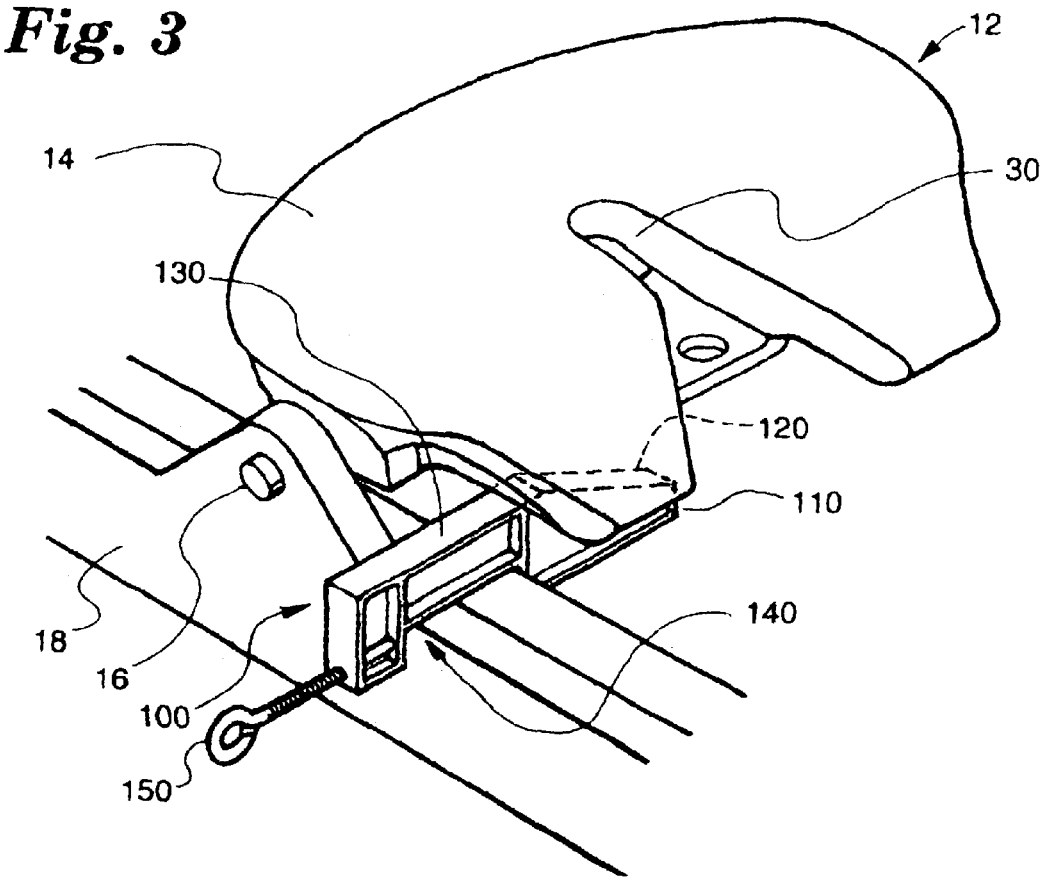
FIG. 3 is a perspective view of the fifth wheel helper of the present invention engaged with a truck fifth wheel hitch.

Referring now to FIGS. 3–4, the first end 110 of the fifth wheel helper 100 is inserted adjacent to the hitch plate 14 with lower surface 114 resting on truck rail 18. As fifth wheel helper 100 is forced in toward fifth wheel hitch plate 14, the hitch plate 14 rides along the ramped surface 120 of the fifth wheel helper, raising the rear portion of the hitch plate 14 and lowering its front portion. As the indentation 140 aligns with the truck frame rails 18, the hitch plate 14 will come to rest on upper surface 130 of fifth wheel helper 100. Safety bolt 150 can then be screwed into indentation 140 to clamp fifth wheel helper 100 on truck frame rail 18, thus holding the fifth wheel helper 100 in place without requiring a user to hold it there. As particularly shown in FIG. 6, the front edge of the hitch plate 14 is now lower than the king pin so the truck can be pulled forward free of the trailer. The fifth wheel helper can then be removed from the truck rail 18 and then stored on the truck until it is needed again.

It is anticipated that the fifth wheel helper 100 can be formed of wood with steel plate reinforcement along the ramped surface 120 and upper surface 130 or, in the alternative, can be formed of a molded plastic or aluminum without the need for the sheet metal surface reinforcement.

It will be understood by one having ordinary skill in the art and by those who practice the invention that various modifications and improvements may be made in the arrangements and details of construction without departing from the spirit and scope of the present invention. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

What is claimed is:

1. Hitch release means for releasing an overridden trailer king pin from a trapped position in front of a rearwardly inclined hitch plate on a truck tractor, wherein the hitch plate is positioned adjacent to a fixed position vehicle frame rail, the hitch release means comprising an elongated beam having a ramped front end that tapers to a narrow front edge, the front edge fitting under a downwardly inclined portion of the hitch plate between the vehicle frame rail and the hitch plate, the beam having sufficient height at a rear portion thereof that the beam holds the hitch plate in a generally horizontal position, where the king pin is released, when the front edge of the beam is wedged under the hitch plate and moved inwardly to an inserted position, the beam having a recess in a lower portion thereof that fits over the frame rail and holds the beam in place when the beam is in said inserted position.

2. Hitch release means according to claim 1 and further comprising a transverse locking bolt threaded through the beam adjacent the recess, an end of the locking bolt extending into the recess, the locking bolt being extendible into the recess so as to engage a frame rail therein and lock the beam on the frame rail.

3. Hitch release means according to claim 1 wherein the recess is at least as wide as the widest frame rail on which the beam is expected to be mounted.

4. Hitch release means according to claim 3 wherein the recess is about six inches long and at least about one inch deep.

5. Hitch release means according to claim 1 wherein the beam is about seventeen inches long.

6. Hitch release means according to claim 1 wherein the beam is about four inches in height.

7. Hitch release means according to claim 1 wherein the beam is molded out of one or more of metal and plastic.

8. Hitch release means according to claim 1 wherein the ramped front end has a downwardly and outwardly inclined upper surface that is about eight inches long.

9. Hitch release means according to claim 1 wherein the beam is at least the width of a nominal two by four wooden beam positioned on its narrower edge.

10. A hitch release device for releasing a trailer king pin from a trapped position in front of an upwardly pivoted fifth wheel hitch plate on a towing vehicle, wherein the hitch plate is pivotally mounted adjacent a fixed position vehicle structural member, the release device comprising an elongated lifting beam having spaced top and bottom sides and having an inclined front portion that tapers downwardly and outwardly between the top and bottom side to a narrow front end, the front end fitting between a downwardly inclined rear portion of the hitch plate and the vehicle structural member, the front portion of the beam serving as a wedge to pry the rear portion of the hitch plate upwardly as the beam is slid inwardly under the hitch plate from a retracted to an inserted position, a rearward portion of the beam being positioned under the hitch plate when the beam has been moved inwardly to its inserted position, the rearward portion of the beam being sufficiently high that the hitch plate is moved upwardly to a released position wherein a front end of the hitch plate is pivoted downwardly to a level below the level of the king pin, the beam having a latching means thereon that engages the vehicle structural member when the beam has been moved to its inserted position, the latching means restraining the beam from sliding outwardly to said released position until the latching means is manually released, the king pin being freed from said trapped position and being movable rearwardly over the hitch plate when the hitch plate is in said released position, such that the towing vehicle can be driven forwardly out of engagement with the trailer while the hitch plate is being maintained in said released position, the latching means being manually releasable so the hitch release device can be slid out from under the hitch plate and removed from the vehicle.

11. In a tractor trailer wherein a towing vehicle includes a fifth wheel hitch plate that is pivotally mounted on a vehicle frame for movement between a rearwardly inclined position and a generally horizontal position and a towed trailer has a downwardly extending king pin that is designed to engage a throat in a rear side of the hitch plate with the hitch plate pivoted to its horizontal position, the improvement comprising a hitch release device for releasing the king pin from a trapped position in front of the hitch plate when the king pin misses the throat and overrides the hitch plate, the hitch release device comprising an elongated member having upper and a lower sides and an outer end that fits under the downwardly pivoted portion of the hitch plate, between the frame and the hitch plate, the device pivoting the hitch plate to a generally horizontal position when the device is moved to an inserted position, the device having releasable latching means thereon for holding the device in an inserted position until manually released.

* * * * *